Patented Jan. 8, 1952

2,581,386

UNITED STATES PATENT OFFICE 2,581,386

HIGH MOLAL AMINE QUATERNARY AMMONIUM DERIVATIVES OF ALPHA-HALOGEN CARBOXY ACID ESTERS OF OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application December 13, 1948, Serial No. 65,089

8 Claims. (Cl. 260—53)

The present invention is concerned with certain new chemical products, compounds, or compositions which have useful application in various arts. The invention is a continuation-in-part of our co-pending application Serial No. 726,209, filed February 3, 1947, and now abandoned. It includes methods or procedures for manufacturing said new chemical products, compounds, or compositions, as well as the compounds, products, or compositions themselves. Said new compounds or compositions are quaternary ammonium compounds obtained by reaction between a hydroxylated high molal amine selected from the class consisting of

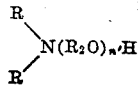

and

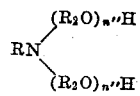

in which R is an alkyl radical having at least 8 and not more than 26 carbon atoms; $R_1$ is an alkyl radical having not over 26 carbon atoms; $R_2O$ is an alkylene oxide radical having not more than 4 carbon atoms and selected from the class consisting of ethylene oxide, butylene oxide, glycide and methylglycide radicals; $n'$ represents the numeral 1 to 6, and $n''$ represents the numeral 1 to 3; and the ester of an alpha-halogen monocarboxylic acid having not over 6 carbon atoms and hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

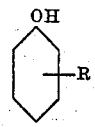

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitute the continuous phase of the emulsion. This specific application is described and claimed in our co-pending application Serial No. 65,088, filed December 13, 1948, now Patent 2,542,004, granted February 20, 1951. The new products are useful as wetting, detergent and leveling agents in the laundry, textile and dyeing industries, as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides; emulsifying agents, as, for example, for cosmetics, spray oils, water-repellent textile finishes; as lubricants, etc.

The esters of alpha-halogen monocarboxy acids with oxyalkylated phenol-aldehyde resins which are converted to the quaternary ammonium compounds of the invention are described in our Patent 2,542,004, granted February 20, 1951. The phenol-aldehyde resins and their oxyalkylation are described in our Patent 2,499,370, granted March 7, 1950. Reference is made to these patents for a description of the phenol-aldehyde resins used, their oxyalkylation and their conversion to alpha-halogen monocarboxy acid esters. For examples of phenol-aldehyde resins, reference is made to Examples 1a through 103a of Patent 2,499,370. For examples of the oxyalkylated resins, reference is made to tables at columns 31 through 46 of Patent 2,542,004. For examples of the alpha-halogen monocarboxy acid esters of these oxyalkylated resins, reference is made to Examples 1c through 39c of Patent 2,542,004.

Having obtained a suitable chloroacetate or the like, such ester can then be reacted with certain hydroxylated high molal amines having at least one radical containing 8 to 22 carbon atoms and at least one hydroxyalkyl radical or the equivalent, for instance, a hydroxyalkyl radical in which the alkyl carbon atom chain is interrupted by an oxygen atom. There may be present a low molal alkyl radical such as a methyl radical. More specifically, the hydroxylated amines contemplated, may be indicated by the following formulae:

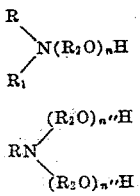

in which R is an alkyl radical having at least 8 and not more than 26 carbon atoms; $R_1$ may be the same as R, or may represent a low molal alkyl radical, such as methyl radical; $R_2O$ is an alkylene oxide radical selected from the class consisting of ethylene oxide, propylene oxide, butylene oxide, glycide, and methylglycide; $n'$ indicates the numeral 1 to 6, and $n''$ indicates the numeral 1 to 3.

Having employed an alpha-chloro low molal fatty acid or its equivalent, the resultant product is a complete or fractional ester of such alpha-chloro low molal acid, and the alpha-chloro atom is, of course, markedly reactive. The next step is to react such complete or fractional ester with an amino type compound of the kind exemplified by the prior formulae:

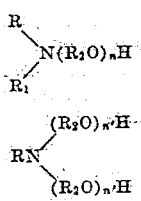

in which R is an alkyl radical having at least 8 and not more than 26 carbon atoms; $R_1$ may be the same as R, or may represent a low molal alkyl radical, such as methyl radical; $R_2O$ is an alkylene oxide radical selected from the class consisting of ethylene oxide, propylene oxide, butylene oxide, glycide, and methylglycide; $n$ indicates the numeral 1 to 6, and $n'$ indicates the numeral 1 to 3.

As to the production of hydroxylated high molal amines of the kind above described, see U. S. Patent No. 2,394,432, dated February 5, 1946, to De Groote and Keiser, or U. S. Patent No. 2,329,699, dated September 21, 1943, to De Groote and Keiser. What is said hereinafter is substantially as it appears in verbatim form in the last aforementioned patent.

The amines employed for reaction, are characterized by containing at least one group having a hydrocarbon radical, which, in turn, has at least 8 carbon atoms and may have as many as 26 carbon atoms, or even more. Such amine is of the hydroxylated type, by virtue of the presence of at least one hydroxy hydrocarbon radical, or similar radicals, in which the carbon atom chain is interrupted at least once by an oxygen atom. Such ether linkages in the hydroxylated radical may occur as many as five times. Such hydroxylated high molal amines are obtained by conventional procedure, in which a high molal primary or secondary amine is submitted to the action of an oxyalkylating agent, such as ethylene oxide, propylene oxide, butylene oxide, glycide, and the like. The oxyalkylating agents employed are the kind which contain 4 carbon atoms or less in the hydrocarbon radical.

Our preferred oxyalkylating agent is ethylene oxide, due to its availability, comparatively low cost, and its increased reactivity, in comparison with other oxyalkylating agents.

As to patents which illustrate the oxyalkylation of high molal amines, reference is made to U. S. Patent No. 2,233,383, dated February 25, 1941, to De Groote and Keiser. See Examples 2, 8 and 14 in said De Groote and Keiser patent. See also U. S. Patent No. 1,970,578, dated August 21, 1934, to Schoeller and Wittwer.

Amines of the kind enumerated, which are used as primary reactants for the manufacture of hydroxylated high molal primary or secondary amines, may be produced in various manners. They may be produced from naphthenic acids, resin acids, fatty acids, oxidized petroleum acids, or the like, by converting the acid into the ester, preferably the ethyl ester or the like, and then converting the ester into the alcohol. Such alcohols derived from various fatty acids, naphthenic acids, oxidized petroleum acids, resin acids, and the like, are available commercially and are employed in the manufacture of wetting agents or the like by sulfating or sulfonating such alcohols. Such high molal alcohols can be converted into the chlorides, and the chlorides reacted with ammonia or a primary or secondary amine to give amines of the type herein contemplated. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid or some other hydroxy acid, such as hydroxystearic acid, one would have a hydroxylated hydrocarbon radical.

In actual practice, amines of the kind herein contemplated can be obtained in various ways. Reference is made to a number of patents which disclose or describe such amines, or the method of manufacturing the same. In some cases, obvious modifications will be required to produce amines of the kind contemplated, but such modifications would be evident to a skilled chemist, without further discussion. See the following patents: U. S. Patents Nos. 1,951,469, Bertsch, March 20, 1934; 2,006,058, Olin, June 25, 1935; 2,033,866, Schrauth, March 10, 1936; 2,074,380, Flett, March 23, 1937; 2,075,825, Nafash, April 6, 1937; 2,078,922, Arnold, May 4, 1937; 2,091,105, Piggott, August 24, 1937; 2,108,147, Speer, February 15, 1938; 2,110,199, Carothers, March 8, 1938; 2,132,902, Lenher, October 11, 1938; 2,178,522, Ralston, October 31, 1938; British 359,001, Johnson, I. G. Farb. A. G. 1932; British 358,114, Carpmael, I. G. Farb. A. G. 1932. See also Industrial and Engineering Chemistry, Industrial Edition, volume 32, No. 4 (1940), p. 436.

In view of what has been said, it will be noted that the group introduced into the amine and derived at least hypothetically from an acid, is really the carbon chain radical of the acyl group of the acid or hypothetical acid, along with what was at least hypothetically the carbonyl carbon atom. For the sake of convenience, this radical will be referred to as a hydrocarbon radical, and it is intended to include derivatives in which a hydrogen atom or a small number of hydrogen atoms have been replaced by the hydroxyl radical; for instance, the hydroxy hydrocarbon radical, which would be supplied by ricinoleic acid, hydroxystearic acid, dihydroxystearic acid, or the like. In the present instance, such usage seems eminently correct, in that the hydrocarbon radical supplies the hydrophobe portion of the amine, and this hydrophobe portion is not changed markedly by the presence of one or two hydroxyl groups, as are present in the case of ricinoleic acid, hydroxystearic acid, or the like; and such hydroxyl groups are essentially non-functional, in that they are not relied upon to supply points of chemical activity. They may slightly decrease the hydrophobe character of the radical to some degree; but this cannot be significant, as can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon" is intended to include the hydroxy hydrocarbon type of the kind in which the hydroxyl group does not materially reduce the hydrophobe character of the hydrocarbon group, as, for example, the group or radical which would be obtained from ricinoleic acid.

Certain facts are obvious in the preparation of the hydroxylated amines. If a secondary amine is employed as a primary reactant, then obviously, only one hydroxylated radical can be introduced. On the other hand, if a primary amine is employed, then two hydroxylated radicals may be introduced by the use of ethylene oxide, or the like. Furthermore, the initial reaction with ethylene oxide or the like does not produce an ether linkage, whereas, subsequent reaction does. Where two high molal groups are present in an amine, they need not be the same. Furthermore, a secondary amine containing one high molal group and one low molal group might be employed. For instance, methyl octylamine, ethyl octylamine, propyl octylamine, methyl decylamine, ethyl decylamine, propyl decylamine, etc. Our preference is to use primary amines as raw materials, rather than secondary amines, and particularly, amines which have been derived from carboxy acids. For instance, note the following: Octadecenylamine, cetylamine, stearylamine, oleoamine, ricinoleoamine; amines derived from naphthenic acids; amines derived from octadecadiene 9, 11-acid-1; octadecylamine; amines derived from mixed unsaturated fatty acids, such as soyabean fatty acids; cottonseed oil fatty acids; linseed oil fatty acids; heptadecylamine, hexadecylamine; dodecylamine; decylamine, etc.

Attention is also directed to the fact that suitable amines can be derived from oxidized wax acids. As to the nature of these acids, see U. S. Patent No. 2,242,837, dated May 20, 1941, to Shields. It is well known that certain varieties of such wax acids contain approximately 22–26 carbon atoms, whereas, oxidized acids containing fewer carbon atoms are also available. It is again desirable to note that the high molal hydrocarbon group joined to the amino nitrogen atom may be aliphatic, alicyclic, aryl, or aralkyl in nature, as, for example, hydroxylated amines obtained by the oxyalkylation of naphthylamine or the like, and substituted naphthylamines, such as alkylated naphthylamines. Attention is directed to the fact that the amines in which there is no aryl group directly joined to the amino nitrogen atom, are comparatively basic in nature, i. e., the type which has previously been indicated as aliphatic, alicyclic, or aralkyl. It is our preference to use the basic type, i. e., we have found hydroxylated high molal amines in which there is no aryl group directly joined to the amino nitrogen atom, to be the most desirable type of reactant for producing the new composition of matter, particularly when it is employed as a demulsifying agent.

From a commercial standpoint we have found that it is the most simple to purchase high molal primary or secondary amines and to treat such primary amines with two or more moles, up to a dozen moles, of alkylene oxide, particularly ethylene oxide or propylene oxide, or treat a secondary amine with one to six moles of either ethylene oxide or propylene oxide. Since these amines are highly basic, reaction takes place in the conventional manner with exceeding ease. We have simply used conventional procedure, and the reaction takes place without the slightest irregularity.

The amines which we prefer to use are those sold by the Armour Chemical Division of Armour & Company, Chicago, Illinois, and the following shows the composition and trade designation of those which we have subjected to oxyethylation and found entirely satisfactory for the production of the quaternary derivatives herein described:

| Chemical | Formula | Armour Trade Name |
|---|---|---|
| Octylamine | $CH_3(CH_2)_6CH_2NH_2$ | Armeen 8. |
| Decylamine | $CH_3(CH_2)_8CH_2NH_2$ | Armeen 10. |
| Dodecylamine | $CH_3(CH_2)_{10}CH_2NH_2$ | Armeen 12. |
| Tetradecylamine | $CH_3(CH_2)_{12}CH_2NH_2$ | Armeen 14. |
| Hexadecylamine | $CH_3(CH_2)_{14}CH_2NH_2$ | Armeen 16. |
| Octadecylamine | $CH_3(CH_2)_{16}CH_2NH_2$ | Armeen 18. |
| Octadecenylamine | $CH_3(CH_2)_7CH{:}CH(CH_2)_7CH_2NH_2$ | Armeen O. |
| Coconut Oil Amine | $CH_3(CH_2)_xCH_2NH_2$ (x-mixed 6 to 16) | Armeen C. |
| Soyabean Amine | 10% $CH_3(CH_2)_{14}CH_2NH_2$<br>10% $CH_3(CH_2)_{16}CH_2NH_2$<br>35% $CH_3(CH_2)_7CH{:}CH(CH_2)_7CH_2NH_2$<br>45% $CH_3(CH_2)_4CH{:}CHCH_2CH{:}CH(CH_2)_7CH_2NH_2$ | Armeen S. |
| Tallow Amine | 30% $CH_3(CH_2)_{14}CH_2NH_2$<br>25% $CH_3(CH_2)_{16}CH_2NH_2$<br>45% $CH_3(CH_2)_7CH{:}CH(CH_2)_7CH_2NH_2$ | Armeen T. |
| Hydrogenated Tallow Amine | 25% $CH_3(CH_2)_{14}CH_2NH_2$<br>75% $CH_3(CH_2)_{16}CH_2NH_2$ | Armeen HT. |
| Secondary Octylamine | $(CH_3(CH_2)_6CH_2)_2NH$ | Diarmeen 8. |
| Secondary Decylamine | $(CH_3(CH_2)_8CH_2)_2NH$ | Diarmeen 10. |
| Secondary Dodecylamine | $(CH_3(CH_2)_{10}CH_2)_2NH$ | Diarmeen 12. |
| Secondary Tetradecylamine | $(CH_3(CH_2)_{12}CH_2)_2NH$ | Diarmeen 14. |
| Secondary Hexadecylamine | $(CH_3(CH_2)_{14}CH_2)_2NH$ | Diarmeen 16. |
| Secondary Octadecylamine | $(CH_3(CH_2)_{16}CH_2)_2NH$ | Diarmeen 18. |
| Secondary Octadecenylamine | $(CH_3(CH_2)_7CH{:}CH(CH_2)_7CH_2)_2NH$ | Diarmeen O. |

We have also employed rosin amine sold under the trade name of "Rosin Amine D," by the Hercules Powder Company, of Wilmington, Delaware. The main component of this particular amine is the folowing:

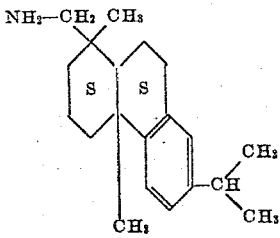

S means the indicated ring is saturated.

Formulae of preferred hydroxylated reactants are as follows:

$CH_3(CH_2)_6CH_2N(C_2H_4OH)_2$
$CH_3(CH_2)_8CH_2N(C_2H_4OH)_2$
$CH_3(CH_2)_{10}CH_2N(C_2H_4OH)_2$
$CH_3(CH_2)_{12}CH_2N(C_2H_4OH)_2$
$CH_3(CH_2)_{14}CH_2N(C_2H_4OH)_2$
$CH_3(CH_2)_{16}CH_2N(C_2H_4OH)_2$
$(CH_3(CH_2)_6CH_2)_2N(C_2H_4OH)$
$(CH_3(CH_2)_8CH_2)_2N(C_2H_4OH)$
$(CH_3(CH_2)_{10}CH_2)_2N(C_2H_4OH)$
$(CH_3(CH_2)_{12}CH_2)_2N(C_2H_4OH)$
$(CH_3(CH_2)_{14}CH_2)_2N(C_2H_4OH)$
$(CH_3(CH_2)_{16}CH_2)_2N(C_2H_4OH)$
$(CH_3(CH_2)_7CH : CH(CH_2)_7CH_2)_2N(C_2H_4OH)$

Example 1d 200 grams of the xylene-containing alpha-chloro acid ester identified as 10c of Patent 2,542,004 were mixed with an equimolar amount, to wit, 50 grams of a tertiary amine obtained by treatment of one mole of a high molal secondary amine with 4½ moles of ethylene oxide. The secondary amine was the product known as Armour's Armeen 2C. It has an approximate molecular weight of 430, and the hydrocarbon chain is obtained from coconut oil fatty acid. See Armeen C previously described. Thus, the specific tertiary amine employed was one of the following composition:

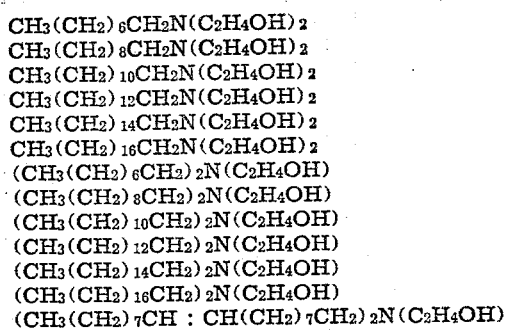

in which $n$ is 4 or 5 on the average, and R is $CH_3(CH_2)_xCH_2$ and $x$ is 6 to 16. The secondary amine, as stated, had a molecular weight of 430, and the tertiary amine as employed, i. e., the oxyethylated derivative, had a molecular weight of 628.

The ester contained xylene, as previously described. Along with the tertiary amine there was invariably added a small amount of xylene, in each case equal in weight to 25% of the tertiary amine. In the instant case this was 12.5 grams. A little xylene was lost during the subsequent reflux period. The experiments were conducted so that in the majority of cases the final product contained approximately 40% xylene. If desired, this xylene could be eliminated by evaporation or vacuum distillation. In the use of the products for demulsification it is convenient to have the xylene present so as to give a non-viscous liquid which can be handled readily.

The two reactants were refluxed at the boiling point of xylene (approximately 140 C.) for 2 to 4 hours. Tests in this kind of reaction have invariably indicated that the reaction was complete usually in less than 2 hours and sometimes in as little as 30 minutes. However, by way of precaution in this experiment, and in succeeding experiments, such time range of 2 to 4 hours was employed. The final product, without eliminating the xylene, was a deep amber-colored liquid, readily water-emulsifiable. The product, after the reaction was completed, contained 38.4% xylene.

Example 2d

The procedure employed was identical with that in Example 1d, except that 250 grams of the ester identified as 15c of Patent 2,542,004 were reacted with 68 grams of the tertiary amine described specifically under the heading of Example 1d. The product contained 38.4% xylene, and its color and emulsifiability were substantially the same as in Example 1d.

Example 3d

The procedure employed was identical with that in Example 1d, except that 400 grams of the ester identified as 13c of Patent 2,542,004 were reacted with 154 grams of the tertiary amine described specifically under the heading of Example 1d. The product contained 39.8% xylene, and its color and emulsifiability were substantially the same as in Example 1d.

Example 4d

The procedure employed was identical with that in Example 1d, except that 400 grams of the ester identified as 14c of Patent 2,542,004, were reacted with 126 grams of the tertiary amine described specifically under the heading of Example 1d. The product contained 39.3% xylene, and its color and emulsifiability were substantially the same as in Example 1d.

Example 5d

The procedure employed was identical with that in Example 1d, except that 400 grams of the ester identified as 8c of Patent 2,542,004, were reacted with 156 grams of the tertiary amine described specifically under the heading of Example 1d. The product contained 37.8% xylene, and its color and emulsifiability were substantially the same as in Example 1d.

Example 6d

The procedure employed was identical with that in Example 1d, except that 400 grams of the ester identified as 9c of Patent 2,542,004 were reacted with 126 grams of the tertiary amine described specifically under the heading of Example 1d. The product contained 38.2% xylene, and its color and emulsifiability were substantially the same as in Example 1d.

Example 7d

The procedure employed was identical with that in Example 1d, except that 400 grams of the ester identified as 2c of Patent 2,542,004 were reacted with 210 grams of the tertiary amine described specifically under the heading of Example 1d. The product contained 39.8% xylene, and its color and emulsifiability were substantially the same as in Example 1d.

Example 8d

The procedure employed was identical with that in Example 1d, except that 400 grams of the ester identified as 12c of Patent 2,542,004 were reacted with 178 grams of the tertiary amine described specifically under the heading of Example 1d. The product contained 43.3% xylene, and its color and emulsifiability were substantially the same as in Example 1d.

Example 9d

The procedure employed was identical with that in Example 1d, except that 400 grams of the ester identified as 19c of Patent 2,542,004 were reacted with 128 grams of the tertiary amine described specifically under the heading of Example 1d. The product contained 37% xylene, and its color and emulsifiability were substantially the same as in Example 1d.

Example 10d

The procedure employed was identical with that in Example 1d, except that 400 grams of the ester identified as 18c of Patent 2,542,004 were reacted with 157 grams of the tertiary amine described specifically under the heading of Example 1d. The product contained 36.4% xylene, and its color and emulsifiability were substantially the same as in Example 1d.

Example 11d

In this example, and in subsequent examples, the amine used was an oxyalkylated derivative of a high molal primary amine. The particular amine employed was the one sold by Armour & Company under the name of Armeen 16D (formerly designated as AM1160). This product was monohexadecylamine. It was treated with 4½ moles of ethylene oxide. The product obtained had the following composition:

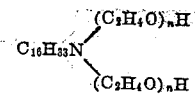

in which $n$ is the number 2 or 3. Except for this difference, in the tertiary amine employed, all other procedure was the same as that employed in Example 1d, preceding. The resulting product was deep amber in color, very water-soluble, and contained 40.8% xylene.

Example 12d

The procedure employed was the same as that in Example 1d, except that 250 grams of the ester identified as 15c of Patent 2,542,004 were reacted with 475 grams of the tertiary amine described specifically under the heading of Example 11d. The product contained 41.8% xylene; it was deep amber in color and very water-soluble.

Example 13d

The procedure employed was the same as that in Example 1d, except that 400 grams of the ester identified as 13c of Patent 2,542,004 were reacted with 108 grams of the tertiary amine described specifically under the heading of Example 11d. The resulting product contained 43.5% xylene, and its color and emulsifiability were about the same as in Example 11d.

Example 14d

The procedure employed was the same as that in Example 1d, except that 400 grams of the ester identified as 14c of Patent 2,542,004 were reacted with 87.5 grams of the tertiary amine described specifically under the heading of Example 11d. The resulting product contained 42% xylene, and its color and emulsifiability were about the same as in Example 11d.

Example 15d

The procedure employed was the same as that in Example 1d, except that 400 grams of the ester identified as 8c of Patent 2,542,004 were reacted with 109 grams of the tertiary amine described specifically under the heading of Example 11d. The resulting product contained 41.6% xylene, and its color and emulsifiability were about the same as in Example 11d.

Example 16d

The procedure employed was the same as that in Example 1d, except that 400 grams of the ester identified as 9c of Patent 2,542,004 were reacted with 87.5 grams of the tertiary amine described specifically under the heading of Example 11d. The resulting product contained 41% xylene, and its color and emulsifiability were about the same as in Example 11d.

Example 17d

The procedure employed was the same as that in Example 1d, except that 400 grams of the ester identified as 2c of Patent 2,542,004 were reacted with 146 grams of the tertiary amine described specifically under the heading of Example 11d.

Example 18d

The procedure employed was the same as that in Example 1d, except that 400 grams of the ester identified as 12c of Patent 2,542,004 were reacted with 124 grams of the tertiary amine described specifically under the heading of Example 11d. The resulting product contained 47.6% xylene, and its color and emulsifiability were about the same as in Example 11d.

Example 19d

The procedure employed was the same as that in Example 1d, except that 400 grams of the ester identified as 19c of Patent 2,542,004 were reacted with 89.5 grams of the tertiary amine described specifically under the heading of Example 11d. The resulting product contained 39.8% xylene, and its color and emulsifiability were about the same as in Example 11d.

Example 20d

The procedure employed was the same as that in Example 1d, except that 400 grams of the ester identified as 18c of Patent 2,542,004 were reacted with 109 grams of the tertiary amine described specifically under the heading of Example 11d. The resulting product contained 40% xylene, and its color and emulsifiability were about the same as in Example 11d.

Example 21d

The procedure employed was the same as that in Example 1d, except that 400 grams of the ester identified as 20c of Patent 2,542,004 were reacted with 76 grams of the tertiary amine described specifically under the heading of Example 11d. The resulting product contained 39.7% xylene, and its color and emulsifiability were about the same as in Example 11d.

Example 22d

The procedure employed was the same as that in Example 1d, except that 400 grams of the ester identified as 3c of Patent 2,542,004 were reacted with 93 grams of the tertiary amine described specifically under the heading of Example 11d. The resulting product contained 39.4% xylene, and its color and emulsifiability were about the same as in Example 11d.

Having thus described our invention, what we

I claim as new and desire to secure by Letters Patent is:

1. A quaternary ammonium compound obtained by reaction between a hydroxylated high molal amine selected from the class consisting of

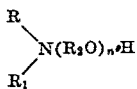

and

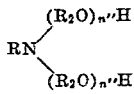

in which R is an alkyl radical having at least 8 and not more than 26 carbon atoms; $R_1$ is an alkyl radical having not over 26 carbon atoms; $R_2O$ is an alkylene oxide radical having not more than 4 carbon atoms and selected from the class consisting of ethylene oxide, butylene oxide, glycide and methylglycide radicals; $n'$ represents the numerals 1 to 6, and $n''$ represents the numeral 1 to 3; and an ester in which the acyl radical is that of an alpha-halogen monocarboxylic acid having not over 6 carbon atoms and composed of carbon, hydrogen, oxygen and halogen and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

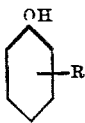

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. A quaternary ammonium compound obtained by reaction between a hydroxylated high molal amine selected from the class consisting of

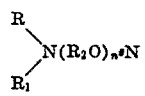

and

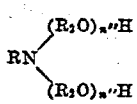

in which R is an alkyl radical having at least 8 and not more than 26 carbon atoms; $R_1$ is an alkyl radical having not over 26 carbon atoms; $R_2O$ is an alkylene oxide radical having not more than 4 carbon atoms and selected from the class consisting of ethylene oxide, butylene oxide, glycide and methylglycide radicals; $n'$ represents the numeral 1 to 6, and $n''$ represents the numeral 1 to 3; and a chloroacetate of certain hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

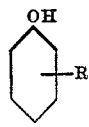

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of the ultimate quaternary ammonium compound as well as the oxyalkylated resin in an equal weight of xylene are sufficient to produce an emulsion when said xylene solution is shaken vigorously with one to three volumes of water.

3. A quaternary ammonium compound obtained by reaction between a hydroxylated high molal amine selected from the class consisting of

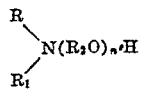

and

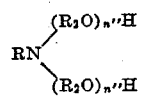

in which R is an alkyl radical having at least 8 and not more than 26 carbon atoms; $R_1$ is an alkyl radical having not over 26 carbon atoms; $R_2O$ is an alkylene oxide radical having not more than 4 carbon atoms and selected from the class consisting of ethylene oxide, butylene oxide, glycide, and methylglycide radicals; $n'$ represents the numeral 1 to 6; and $n''$ represents the numeral 1 to 3; and a chloroacetate of certain hydrophile polyhydric synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

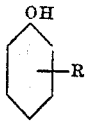

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

4. A quaternary ammonium compound obtained by reaction between a hydroxylated high molal amine selected from the class consisting of

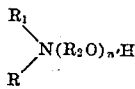

and

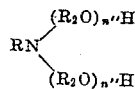

in which R is an alkyl radical having at least 8 and not more than 26 carbon atoms; $R_1$ is an alkyl radical having not over 26 carbon atoms; $R_2O$ is an alkylene oxide radical having not more than 4 carbon atoms and selected from the class consisting of ethylene oxide, butylene oxide, glycide, and methylglycide radicals; $n'$ represents the numeral 1 to 6, and $n''$ represents the numeral 1 to 3; and a chloroacetate of certain hydrophile synthetic products; said hydrophile synthetic products being oxyethylation products of (A) ethylene oxide, and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula

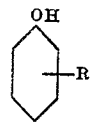

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

5. The product of claim 4, wherein R is substituted in the para position.

6. The product of claim 4, wherein R is a butyl radical substituted in the para position.

7. The product of claim 4, wherein R is an amyl radical substituted in the para position.

8. The product of claim 4, wherein R is a nonyl radical substituted in the para position

MELVIN DE GROOTE.
BERNHARD KEISER.

REFERENCES CITED

The following references are of record in the file of this patent:

UNITED STATES PATENTS

| Number | Name | Date |
|---|---|---|
| 2,499,365 | De Groote | Mar. 7, 1950 |